United States Patent Office 3,849,398
Patented Nov. 19, 1974

3,849,398
ANTIBIOTIC HAVING PARASITICIDAL ACTIVITY
Mamoru Arai, Tatsuo Haneishi, Hisashi Kayamori, Yoo Takiguchi, Noritoshi Kitano, and Susumu Kaneko, Tokyo, Japan, assignors to Sankyo Company Limited
Filed Aug. 2, 1972, Ser. No. 277,588
Claims priority, application Japan, Aug. 3, 1971, 46/58,536
Int. Cl. C07d 51/52
U.S. Cl. 260—211.5 AB          1 Claim

ABSTRACT OF THE DISCLOSURE

An antibiotic aspiculamycin having the structural formula

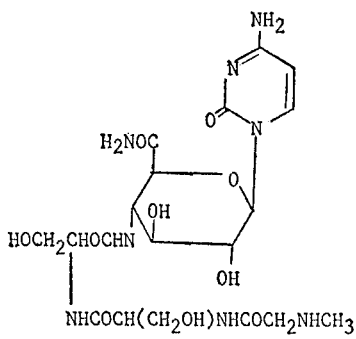

Figure 1:
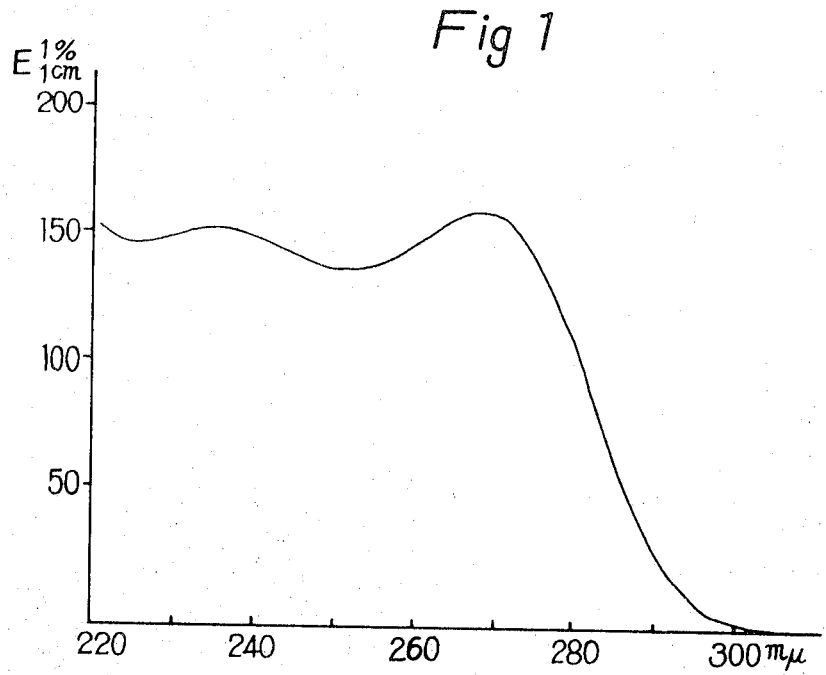

The antibiotic has parasiticidal action against parasites on animals, such as pinworms and the like.

---

This invention relates to a novel antibiotic named aspiculamycin.

We have found that the antibiotic aspiculamycin is produced in a culture of *Streptomyces toyocaensis* var. *aspiculamyceticus* strain No. 1040, a novel actinomycetes, which was first isolated from a sample of soil collected in Hiraizumi, Iwate Prefecture, Japan. The present antibiotic is isolated by extraction from the culture filtrate and purified. It is markedly characterized in that the antibiotic has parasiticidal action against parasites on animals, such as pin worm and the like, though it shows a weak antibacterial activity against gram-positive, gram-negative bacteria and tubercule bacillus, etc.

Morphological characteristics of the aforesaid strain No. 1040 are as follows:

(1) When observed under a microscope, aerial mycelium extends from well-branched substrate mycelium, and at the top of the aerial mycelium a chain of spores is formed.

The aerial mycelium forms numerous cluster-like branches. The aerial hyphae are terminated with spirals which are in coils of 5 to 20 turns. Spore chains are generally in 50 or more spores per spore chain. Spores are spherical to elliptical in shape and 0.4–0.6 x 0.7–1.0μ in size.

(2) Results obtained in the culture of strain No. 1040 on various media (observation was made after a two-week cultivation at 27° C. in each medium, unless otherwise specified) are shown in Table 1. Generally, the aerial hypha and spores are powdery, and the mycelium are small in number. Colors were determined according to "Guide to Color Standard" (a manual published by Nippon Shikisai Kenkyusho).

(3) Physiological properties of strain No. 1040 are shown in Table 2.

TABLE 2

Temperature range for growth__ 10–40° C.
Gelatin liquefaction_____ + moderate.
Hydrolysis of starch_____ + moderate.
Coagulation of skim milk_____ + at 25° and 37° C.
Peptonization of skim milk____ + at 25° and 37° C. (pH 6.6).
Melanin formation:
  On tyrosine-agar medium__ —.
  On peptone-yeast iron agar medium _____ —.
Nitrate reduction_____ +.

(4) Carbon source utilization pattern of strain No. 1040 in Pridham-Gottlieb's agar medium is shown in Table 3.

TABLE 3

| | |
|---|---|
| L-arabinose | + |
| D-xylose | ± |
| D-glucose | ++ |
| D-fructose | ++ |
| Sucrose | — |
| Inositol | +++ |
| Raffinose | — |
| D-mannitol | ++ |
| L-rhamnose | + |
| Cellulose | — |

In the search for known strains having properties similar to those of strain No. 1040, there may be mentioned *Streptomyces toyocaensis* which has been described in The Actinomycetes, vol. 2 (Waksman, 1961). From the fact that strain No. 1040 produces simultaneously an antibiotic, toyocamycin, in addition a new antibiotic aspiculamycin in the same manner as in *Streptomyces toyocaensis*, it is considered that strain No. 1040 is a member of the genus *Streptomyces* belonging to *Streptomyces toyo-caensis*. Strain No. 1040, however, differs from *Streptomyces toyocaensis* in the following respects.

TABLE 1

| Medium | Growth | Mycelium | | | Soluble pigment |
| | | Aerial | Substrate | Reverse | |
|---|---|---|---|---|---|
| Sucrose nitrate agar | Moderate | Pale brown | Colorless | Pale brown | None. |
| Glucose asparagine agar | Abundant | do | Brownish white | Yellowish grey | Do. |
| Glycerol asparagine agar | do | Brownish grey | do | do | Do. |
| Salts-starch agar | do | do | do | do | Do. |
| Tyrosine agar | do | Bright brownish grey | Yellowish grey | Pale yellowish brown | Do. |
| Nutrient agar | Good | White | do | do | Do. |
| Yeast-malt agar | Abundant | Greyish brown | Pale yellowish brown | do | Do. |
| Oatmeal agar | do | Brownish grey | Yellowish grey | Yellowish grey | Do. |

① Strain No. 1040 forms a long spiral filament, whereas *Streptomyces toyocaensis* forms a short spiral.
② Strain No. 1040 forms a spiral filament on a starch/inorganic salt medium, whereas *Streptomyces toyocaensis* does not form the same.
③ On any media, strain No. 1040 grows very well, compared with *Streptomyces toyocaensis*.
④ The two strains are somewhat different from each other in color of aerial and substrate mycelium when grown on various media.
⑤ Strain No. 1040 produces a new antibiotic, aspiculamycin.

From the above, strain No. 1040 has been identified as one of variants of *Streptomyces toyocaensis* and named *Streptomyces toyocaensis* var. *aspiculamyceticus*. Strain No. 1040 has been deposited under accession No. 1036 with Technical Research Institute of Microbial Industry, Agency of Industrial Science & Technology, Japan.

Having thus explained the characteristics of strain No. 1040, it is well known that various properties of *Streptomyces* are not definite, but may be easily varied naturally and artificially. Consequently, the strains usable in the present invention include all of the strains which belong to genus *Streptomyces* and which are capable of producing aspiculamycin.

Cultivation of the strain in the present invention may be carried out according to the method generally employed for *Streptomyces*. In carrying the cultivation into practice, advantageous results are obtained when the strain is inoculated into a liquid medium with approximately neutral pH and cultured at 25–35° C. under aerated agitation. The medium may contain, as a carbon source, starch, glucose, glycerine, etc., as a nitrogen source, meat extract, peptone, corn steep liquor, soybean meal, yeast, cotton seed meal, etc., and as an inorganic salt, sodium chloride, potassium chloride, calcium carbonate, phosphates or the like. Usually, the amount of aspiculamycin produced in a cultured broth reaches maximum in 40–120 hours.

To recover aspiculamycin from the cultured broth, any means commonly used in recovering natural products may suitably be employed. For instance, such means as relying on utilization of the difference in solubility and in adsorbability on an ion exchange resin between aspiculamycin and the imprities, may be used alone or in combination or repetition.

For example, aspiculamycin may be recovered by filtration of the cultured broth after adjustment of its pH to acidic to neutral together with such filter aids as diatomaceous earth, removing mycelium, passing the filtrate onto a cation exchange thereby to have the present antibiotic adsorbed thereon and then eluting the adsorbed antibiotic with an appropriate acid, alkali or inorganic salt solution. In that case, two antifungal antibiotics, i.e. tetraene and toyocamycin, may be simultaneously separated from aspiculamycin, because the tetraene is not adsorbed onto the cation exchange resin and the toyocamycin is eluted at a pH lower than that of aspiculamycin. Aspiculamycin can also be recovered by adsorbing the culture filtrate onto activated carbon at an acidic to neutral pH and extracting aspiculamycin with an acidified aqueous methanol or aqueous acetone. The concentrated culture liquid may be further purified using a cation exchange resin and an anion exchange resin. After concentrating an aqueous solution containing the extracted, isolated and purified aspiculamycin, the solution is subjected to lyophilization or precipitation with an organic solvent, e.g. methanol, ethanol, acetone, etc., whereby aspiculamycin can be obtained in the form of a white powder. Aspiculamycin is crystallized from aqueous acetone.

The new antibiotic of the present invention which is named aspiculamycin has the following structural formula.

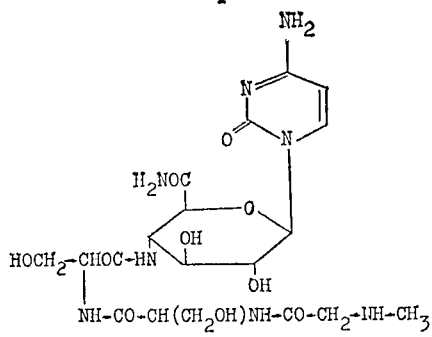

The physico-chemical properties of aspiculamycin are given below.

(1) White needle crystals.

(2) Melting point: Decomposition begins gradually at 200° C. or above, though an accurate melting point is undeterminable.

(3) Elementary analysis for $C_{19}H_{30}O_{10}N_8 \cdot \frac{1}{2}H_2O$: Calculated: C, 42.37%; H, 5.58%; N, 20.82%; O, 31.22%. Found: C, 42.63%; H, 5.78%; N, 20.52%; O, 31.07%.

(4) Molecular weight: 490.5, as measured according to the vapor pressure method; 530, as calculated on the basis of the molecular formula.

(5) Specific rotation: $[\alpha]_D^{20} = +54.0°$ (C.=1, water).

(6) Ultraviolet absorption spectrum: As shown in FIG. 1, values of a maximum absorption in water and 0.05 N NaOH solution are 236 m$\mu$ $$(E_{1cm.}^{1\%} = 156)$$

and 268 m$\mu$ $$(E_{1cm.}^{1\%} = 164),$$

respectively, and the value in 0.05N HCl solution is 276 m$\mu$ $$(E_{1cm.}^{1\%} = 214).$$

Figure 2:
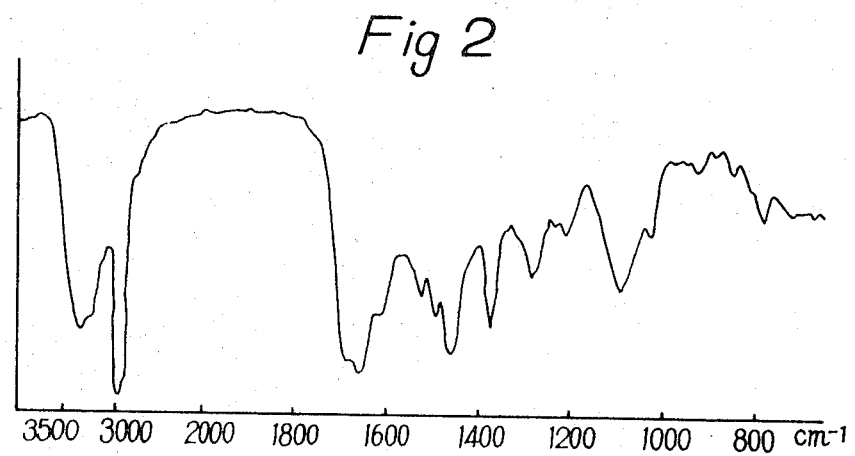

(7) Infrared absorption spectrum: The spectrum as measured in Nujol mull is as shown in FIG. 2. The major absorption occurs at 3350, 3200, 1690, 1660, 1610, 1530, 1495, 1290, 1210, 1090, 1030, 940, 850, 790 cm.$^{-1}$.

(8) Solubility: Aspiculamycin is easily soluble in water, but insoluble in methanol, ethanol, acetone, chloroform, etc.

(9) Color reaction: Positive to Ninhydrin and 2,4-dinitrophenyl hydrazine reactions. Negative to Molisch, Anthrone, Fehling reactions, and silver nitrate is not reduced.

(10) A basic substance with pKa'$_1$ 3.90:pKa'$_2$ 8.24.

(11) Chromatography: By paper chromatography when developed with water and water-saturated butanol using Toyo Filter Paper No. 51, R$f$ values are 0.37 and 0, respectively. By a thin layer chromatography on Eastman chromagram Sheet 6065, R$f$ value in a solvent system constituting of a mixture of n-butanol, acetic acid and water (4:1:1) is 0.05, and 0.40 in a mixture of n-propanol, pyridine, acetic acid and water (15:10:3:10).

The biological activities of aspiculamycin are set forth below:

(1) Table 4 shows the minimal inhibitory concentration of aspiculamycin against various bacteria, fungi, yeasts and plant pathogenic microorganisms. The activities against bacteria were determined on a nutrient agar after incubation at 37° C. for 24 hours. In the case of tubercle bacillus, the determination was conducted after 48 hour incubation at 37° C. for 24 hours. In the case of tubercule and yeasts on Sabouraud's agar and plant pathogenic fungi on a potato-sucrose agar were incubated at 25° C. for 48 hours, respectively.

TABLE 4

| Microorganism: | Minimal inhibitory concentration (μg./ml.) |
|---|---|
| Staphylococcus aureus 209P | 400 |
| Staphylococcus aureus 56 | >400 |
| Staphylococcus aureus 1557 | >400 |
| Staphylococcus aureus 193 | 400 |
| Staphylococcus aureus 52–34 | 400 |
| Bacillus subtilis | 200 |
| Sarcina lutea | 200 |
| Corynebacterium xerosis | 400 |
| Aeromonas punclata | 400 |
| Pseudomonas aeruginosa | 400 |
| Proteus vulgaris | 400 |
| Escherichia coli NIHJ | 200 |
| Escherichia coli K–12 | 200 |
| Escherichia coli (resistant to streptothricin) | 200 |
| Escherichia coli (resistant to streptomycin) | 100 |
| Escherichia coli (resistant to kanamycin) | 50 |
| Escherichia coli (resistant to chloramphenicol, tetracycline) | 50 |
| Escherichia coli 97 (multi-resistant) | >400 |
| Mycobacterium smegmatis 607 | 50 |
| Candida albicans Yu 1200 | >400 |
| Saccharomyces cerevisiae | >400 |
| Trichophyton interdigitale | >400 |
| Cryptococcus neoformans | >400 |
| Aspergillus nigar | >400 |
| Penicillium chrysogenum | >400 |
| Hormodendrum pedrosoi | >400 |
| Botorytis cinerea | >400 |
| Fusarium moniriforme | >400 |
| Gloeosporium kaki | >400 |

(2) When acute toxicity of the present antibiotic in mice by intravenous injection were examined, three-fifths thereof were killed at a dose of 25 mg./kg., and three-fifths thereof survived at a dose of 10 mg./kg. In the case of oral administration, two-fifths of the mice were killed at a dose of 125 mg./kg.

(3) Aspiculamycin has remarkable activity to inhibit parasites on animals from ovulation as well as parasiticidal action. For example, Table 5 shows the results obtained in the ovulation inhibition test on pin worms, such as Syphacia obvelate and Aspiouluris tetraptera in mice. Mice maintaied on a basal diet were divided into three groups, each consisting of 5 mice: group 1 was injected with basal diet without aspiculamycin; groups 2 and 3 were injected with basal diet with 100 mg. and 50 mg. of aspiculamycin per 1 kg. of the basal diet, respectively.

This test is intended to observe the progress of ovulation with a lapse of time of 4 weeks after administration, and, at the same time, to examine the parasiticidal effect by counting the number of parasites in the intestine at autopsy after completion of the test.

As can be seen from the results shown in Table 5, perfect inhibition of ovluation is attained within 4 weeks in both cases of the administration with dosages of 100 mg. and 50 mg./kg., and from the results obtained in the autopsy, it is recognized that a perfect parasiticidal effect is attained.

TABLE 5

| | Group 1 | | | | | Group 2 | | | | | Group 3 | | | | |
|---|---|---|---|---|---|---|---|---|---|---|---|---|---|---|---|
| | 1 | 2 | 3 | 4 | 5 | 1 | 2 | 3 | 4 | 5 | 1 | 2 | 3 | 4 | 5 |
| Day on which administration started | ++ | + | ++ | ++ | ++ | + | + | +++ | ++ | + | + | ++ | + | ++ | + |
| 4th day | – | + | – | – | – | – | – | – | – | – | – | +++ | – | +++ | – |
| 7th day | + | + | – | +++ | – | – | – | – | – | – | + | – | – | +++ | – |
| 14th day | – | + | + | + | – | – | – | – | – | – | + | – | – | – | – |
| 21st day | + | + | + | – | – | – | – | – | – | – | + | – | – | – | – |
| 28th day | – | + | + | – | – | – | – | – | – | – | – | – | – | – | – |
| Number of pinworms after autopsy | 6 | 7 | 9 | 0 | 6 | 0 | 0 | 0 | 0 | 0 | 0 | 0 | 0 | 0 | |

Furthermore, minimal inhibitory concentrations on Mycoplasma of aspiculamycin are shown in the following table.

| Mycoplasma: | M.I.C. (μg./ml.) |
|---|---|
| Mycoplasma mycoides var. mycoides | 25 |
| M. agalactiae | 1.56 |
| M. mycoides var. capri | 1.56 |
| M. arthritidis | 6.25 |
| M. laidlawii | 25 |
| M. bovigenitalium | 6.25 |
| M. pulmonis | 1.56 |
| M. gailisepticum | 1.56 |
| M. canis | 12.5 |
| M. felis | 3.12 |
| M. hyorhinis | 0.78 |
| M. hominis type 1 | 3.12 |

Thus, it has been confirmed that aspiculamycin is a new antibiotic in view of the fact that no antibiotics having such physicochemical and biological properties as mentioned above have been heretofore known.

The present invention is illustrated below with reference to an example. It is evident, however, that the objects of the invention may be accomplished even by employing many means which have not illustrated concretely in the specification but are within the scope of the present invention, since various properties of aspiculamycin have already been unveiled hereinabove.

EXAMPLE

A liquid medium containing 3.0% starch, 1.0% meat extract, 1.5% pharmamedia and 2.0% corn steep liquor is adjusted to pH 7.6 and the medium is sterilized at 120°

C. for 30 minutes. The medium is inoculated with a strain of *Streptomyces toyocaensis* var. *aspiculamyceticus*, and the strain is cultured under aerated agitation. The cultivation is continued while monitoring the potency of a cultured broth using *Escherichia coli* NIHJ as a test microorganism until the maximum potency is attained. Usually, the potency reached the highest level in 5 to 6 days when 100 ml. of the medium placed in a 500 ml. Sakaguchi flask was subjected to shaking culture. Furthermore, when the culture broth which had been precultered for 48 hours was inoculated into 60 l. of the medium in 100 l. fermentors and the cultivation was carried out with agitation at a rate of 150 r.p.m., while passing therethrough sterile air at a rate of 60 l./min., production of aspiculamycin reached the highest level in about 90 hours. In a filtrate of the final culture broth thus obtained, there were simultaneously produced two antibiotics, a tetraene-like antibiotic showing antibacterial activity against gram positive bacteria and yeasts, and toyocamycin.

Extraction and purification of aspiculamycin produced are effected according to the following procedure.

(1) To 5 l. of the culture broth obtained in the Sakaguchi's flask according to the procedure as mentioned above, there was added 10% of diatomaceous earth, and the mixture was filtered. The resulting filtrate to which 2% of an activated carbon had been added was agitated and then filtered. The activated carbon was washed with 2 l. of water. The activated carbon thus washed was extracted 2 times with 1 l. of 50% acetone acidified with hydrochloric acid to pH 2. After neutralization, the resulting extract was concentrated under reduced pressure to obtain 500 ml. of a concentrate containing aspiculamycin together with toyocamycin. Aspiculamycin present in the concentrate thus obtained was further purified by column chromatography on Amberlite IRC-50 which is a weakly acidic cation exchange resin. The concentrate was added onto Amberlite IRC-50 of $NH_4^+$ type, whereby toyocamycin which had been mixed therein was recovered in a non-adsorbed portion to be removed. After water-washing, elution with 0.5 N $NH_4OH$ was carried out. Active fractions were concentrated and, after removal of ammonia, impurities were removed by adsorption onto Dowex 1 X 1 of $OH^-$ type which is a strongly basic anion exchange resin, the active fractions passing therethrough were concentrated and lyophilized to obtain 0.8 g. of aspiculamycin in the form of a white powder.

(2) Sixty (60) liters of the aforesaid tank cultured broth was filtered together with 6 kg. of diatomaceous earth. The filtrate was passed through a resin column packed with 6 l. of Amberlite IRC-50 of $H^+$ type, thereby removing tetraene, and the adsorbed fractions were eluted with 1N $NH_4OH$. Toyocamycin was first eluted and then aspiculamycin was eluted. Fractions containing the aspiculamycin were concentrated, and 2 l. of the concentrate was adsorbed onto Amberlite CG-50, which had previously been equilibrated with ammonium sulfate buffer solution of pH 7.0, and eluted with 0.05 M diammonium hydrogen phosphate. Active fractions containing aspiculamycin were adsorbed onto Amberlite CG-50 of $H^+$ type, washed with water, eluted with 0.5N $NH_4OH$, desalted and then concentrated. The concentrate thus obtained was precipitated with acetone, and the precipitate was collected by centrifugal separation. The collected precipitate was dissolved in water and lyophilized to obtain 2.5 g. of aspiculamycin in the form of a white powder. One gram of powder thus obtained was dissolved in 10 ml. of water and 40 ml. of acetone was added thereto, thereby crystallizing aspiculamycin. The yield of crystalline antibiotic was 200 mg.

In the accompanying drawing, FIG. 1 shows an ultraviolet absorption spectrum of aspiculamycin, and FIG. 2 shows an infrared absorption spectrum.

What we claim is:

1. An antibiotic aspiculamycin having the structural formula

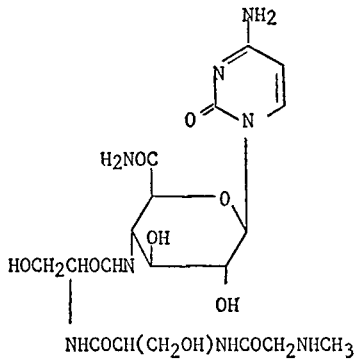

References Cited

UNITED STATES PATENTS 3,625,940   12/1971   Suzuki et al. _____ 260—211.5 R

JOHNNIE R. BROWN, Primary Examiner

U.S. Cl. X.R.

195—80; 260—211.5 R; 424—180